March 24, 1970     B. KENNEL     3,502,010
DUAL PURPOSE CIRCUIT ARRANGEMENT FOR CAMERA SHUTTER
CONTROL AND LIGHT INTENSITY INDICATION
Filed Jan. 21, 1966     2 Sheets-Sheet 1

INVENTOR.
BERTRAM KENNEL
BY
Michael J. Striker

United States Patent Office 3,502,010
Patented Mar. 24, 1970

3,502,010
DUAL PURPOSE CIRCUIT ARRANGEMENT FOR CAMERA SHUTTER CONTROL AND LIGHT INTENSITY INDICATION
Bertram Kennel, Munich, Germany, assignor to Agfa-Gevaert Aktiengesellschaft, Leverkusen, Germany
Filed Jan. 21, 1966, Ser. No. 522,283
Claims priority, application Germany, Feb. 9, 1965,
A 48,353
Int. Cl. G01j 1/44; G03b 7/08
U.S. Cl. 95—10                                  14 Claims

ABSTRACT OF THE DISCLOSURE

An arrangement adapted for photographic cameras by which the user can determine whether sufficient light intensity prevails to take a satisfactory exposure. A photosensitive resistor exposed to the prevailing light, varies in resistance with the magnitude of the light intensity. A resistor connected in series with the photosensitive resistor forms a voltage divider with the latter, when the series combination is applied across a source of DC voltage. The junction of the photosensitive resistor and the resistor is connected to a control switch which, in turn, turns a light on or off depending upon the state of the switch. With the junction voltage determined by the prevailing light intensity, the lamp provides an indication of the light intensity through the action of the switch.

---

Figure 1:
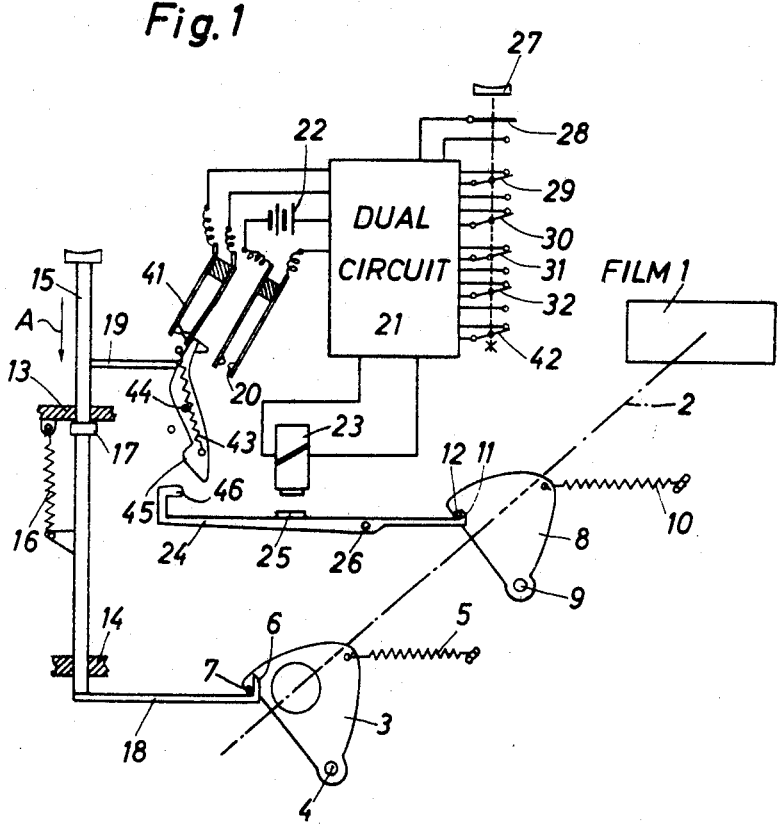

The present invention relates to a dual purpose circuit arrangement for a camera. More particularly, the invention relates to a dual purpose circuit arrangement for shutter control of the camera and for light intensity indication. The circuit arrangement of the present invention is utilized in cameras which do not have photocell or photosensitive control units also known as light meters.

Photocell control of the exposure time of a camera is a relatively recent innovation and many cameras exist without such control. In such a camera, the shutter remains open during the exposure time until the film has been exposed. If the light intensity is inadequate, however, the resultant picture is blurred and may be otherwise unsatisfactory. In order to indicate the adequacy of the light intensity in a camera with a light meter control unit, so that the photographer may be appraised of light conditions which are unsuitable for taking pictures without the use of a mount for the camera, for example, the light meter control unit, which is utilized to control the movement of the shutter, is utilized to actuate a warning circuit when, as indicated by the said control unit, the light intensity falls below a determined level. The warning circuit may energize a warning light, for example. This solution is not available, of course, in cameras without light meter control units.

The principal object of the present invention is to provide a new and improved dual purpose circuit arrangement for shuttter control and light intensity indication in a camera without a photosensitive control unit.

An object of the present invention is to provide a circuit arrangement for light intensity indication in a camera without a photosensitive control unit, which circuit is simple but effective and reliable in operation.

Another object of the present invention is to provide a circuit arrangement for light intensity indication in a camera without a light meter control unit, which circuit is inexpensive in manufacture and is operated with facility.

In accordance with the present invention, a dual circuit arrangement for camera shutter control and light intensity indication in a camera having light-sensitive film and a shutter for controlling the impingement of light from an object to be photographed onto the film includes an electromagnet for controlling the operation of the shutter. A circuit connects a source of DC voltage to the electromagnet through a silicon controlled rectifier having an anode, a cathode and a control electrode for controlling the conductive condition of the silicon controlled rectifier. A further circuit connects the source of DC voltage to the control electrode of the silicon controlled rectifier for supplying a control current to the control electrode of the silicon controlled rectifier. The dual circuit arrangement also includes electrically energizable warning means and a photoresistor adapted to receive light from an object to be photographed and having an electrical resistance which has a magnitude determined by the intensity of light impinging on the photoresistor. A plurality of manually operable switches is connected in each of the circuit and the further circuit and to each of the photoresistor and the warning means for connecting the source of DC voltage to the warning means through the silicon controlled rectifier and for connecting the photoresistor into the further circuit in a manner wherein the intensity of light of the object to be photographed determines the electrical resistance of the photoresistor which determines the magnitude of the control current supplied by the source of DC voltage to the silicon controlled rectifier thereby controlling the conductive condition of the silicon controlled rectifier to control the energization of the warning means.

Figure 2:
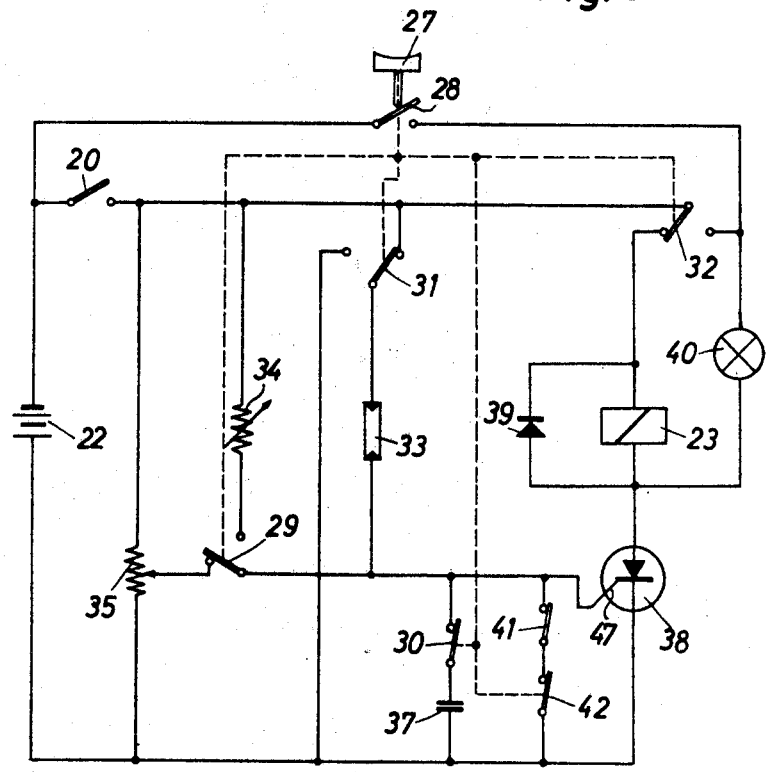

In order that the present invention may be readily carried into effect, it will now be described with reference to the accompanying drawings, wherein;

FIG. 1 is a schematic diagram of a shutter control system for a camera without a light meter control unit including an embodiment of the circuit arrangement of the present invention; and FIG. 2 is a circuit diagram of an embodiment of the dual purpose circuit arrangement of the present invention for shutter control and light intensity indication in a camera without a light meter control unit.

In FIG. 1, a film 1 is exposed to light in a path having an optical axis 2 from an object being photographed. A first lamella 3 is pivotally mounted at a pivot point 4 in the light path 2, so that said first lamella is pivotally movable into and out of the path of light. A spring 5, affixed at one end to the camera housing and at the other end to the first lamella 3, urges said first lamella in a clockwise direction about the pivot point 4. A projection or pin 7 on the first lamella 3 cooperates with a detent or hook 6 to prevent said first lamella from being moved out of the light path 2 by the spring 5.

A second lamella 8 is pivotally mounted at a pivot point 9 in a plane substantially parallel to the plane of the first lamella 3 but spaced therefrom, so that said second lamella is pivotally movable into and out of the light path 2. A spring 10, affixed at one end to the camera housing and at the other end to the second lamella 8, urges said second lamella in a clockwise direction about the pivot point 9. A projection or pin 12 on the second lamella 8 cooperates with a detent or hook 11 to prevent said second lamella from being moved into the light path 2 by the spring 10.

Spaced guides 13 and 14 affixed to the camera housing mount a release rod 15 for axial movement which is against the force of a spring 16, affixed at one end to the guide 13 and affixed at the other end to said release rod. A projection collar 17 on the release rod 15 abuts against the guide 13 to prevent movement of said release rod under the force of the spring 16 beyond a determined point. The detent 6 extends from an arm 18 which is affixed to and extends in a radial direction from the release rod 15. Thus, when the release rod 15 is moved under manual pressure in the direction of an arrow A, the arm 18, and therefore the detent 6, are moved in the same direction, and the first lamella 3 is released from engagement with said detent and is moved out of the light path 2 by the spring 5.

An arm 19 is affixed to the release rod 15 and extends in a radial direction therefrom in spaced relation from the arm 18. The arm 19 controls the movement of a switch arm 45 which is pivotally mounted on a pin 44 affixed to the camera housing for pivotal movement about said pin. A spring 43 is affixed at one end to the camera housing and at the other end to the switch arm 45 and urges said switch arm to move in a counterclockwise direction to maintain the contacts of a switch 41 closed. When the release rod 15 is manually moved in the direction of the arrow A, the arm 19 moves the switch arm 45 in a clockwise direction, against the action of the spring 43, and said switch arm opens the contacts of the switch 41 and closes the contacts of a switch 20.

The dual circuit of the present invention is shown in FIG. 1 as a block 21. The dual circuit 21 includes the switch 20, connected thereto via a battery 22, the switch 41 connected therein, an electromagnet 23 connected therein and a plurality of switches 28, 29, 30, 31, 32 and 42 connected therein. When the electromagnet 23 is energized by the dual circuit 21 it attracts a soft iron part 25 of an arm 24 which is pivotally mounted on a pin 26 affixed to the camera housing. The arm 24 is pivotally movable about the pin 26 and is moved in a clockwise direction when attracted by the electromagnet 23.

The detent 11 extends from one end of the arm 24, so that when said arm is moved in a clockwise direction, said detent is moved away from the pin 12, and the second lamella 8 is released from engagement with said detent and is moved into the light path 2 by the spring 10. An extending portion 46 extends from the other end of the arm 24 and moves the switch arm 45 in a counterclockwise direction so that the switch 20 is opened and the switch 41 is closed, when the arm 24 is moved in a clockwise direction about the pin 26.

FIG. 2 illustrates an embodiment of the dual circuit arrangement of the present invention. A manually operated push button switch 27 is mechanically coupled to the switches 28, 29, 30, 31, 32 and 42 and moves said switches from their positions shown in FIG. 2 to their other positions. When the switches 28, 29, 30, 31, 32 and 42 are in their positions shown in FIG. 2, the dual circuit provides shutter control for the camera in which it is installed. When the switches 28, 29, 30, 31, 32 and 42 are moved to their opposite position by the manual switch 27, the dual circuit provides a light intensity indication warning of insufficient light for a clear picture.

A silicon controlled rectifier or SCR 38 is connected with its anode and cathode in series circuit arrangement with the battery 22 via the electromagnet 23 and the switches 32 and 20, when the switch 32 is in its position shown in FIG. 2, and is connected with its anode and cathode in series circuit arrangement with said battery via a warning lamp 40 and the switches 32 and 20 when the switch 32 is in its other position. A silicon controlled rectifier is an ON-OFF switch which conducts current in only one direction. It is turned ON by a control current supplied to its gate or control electrode. A silicon controlled rectifier is well known and is fully described in Silicon Controlled Rectifier Manual, second edition, 1961, General Electric Company.

The SCR 38 has a gate or control electrode 47 connected to the tap of a voltage divider 35 via the switch 29, when the switch 29 is in its position shown in FIG. 2, and to one end of a variable resistor 34 when said switch is in its opposite position. The gate or control electrode 47 of the SCR 38 is connected to one end of a photoresistor 33, to one plate of a charging capacitor 37 via the switch 30 when said switch is in its position shown in FIG. 2 and to a pair of switches 41 and 42. A diode 39 is shunted across the electromagnet 23 to protect the SCR 38 from overload upon deenergization of said electromagnet.

The voltage divider 35 is connected across the battery 22 via the switch 20. The end of the variable resistor 34 connected to the switch 29 is connected through said switch to one terminal of the battery 22 via said switch and the photoresistor 33 and the switch 31 when the switches 29 and 31 are in their positions opposite those shown in FIG. 2. The other end of the variable resistor 34 is connected to the other terminal of the battery 22 via the switch 20. When the switches 29 and 30 are in their positions shown in FIG. 2, the charging capacitor 37 is connected across the battery 22 via said switches and the voltage divider 35 and switch 20, and said charging capacitor is charged if the switch 41 is open. Under the same circumstances, when the switches 41 and 42 are closed, as shown in FIG. 2, the charging capacitor 37 is short-circuited. If the switch 41 is open and the switch 30 is closed, the charging capacitor 37 discharges to supply a current to the gate 47 of the SCR 38 which is of sufficient magnitude to switch said SCR to its conductive condition.

In operation, when the release rod 15 is manually moved in the direction of the arrow A, the switch 20 is closed and the switch 41 is opened by action of the arm 19 and the switch arm 45. The first lamella 3 is released from the detent 6 and is moved by its spring 5 out of the light path 2, when the release rod 15 is moved in the direction of the arrow A. The exposure of the film 1 then commences and the charging capacitor 37 is charged via the switch 30, the photoresistor 33, the switch 31 and the switch 20. The charging capacitor 37 is charged because the switch 41 is open, thereby preventing short-circuiting of said charging capacitor.

After the charging capacitor 37 is charged sufficiently, the excess voltage provides a current of sufficient magnitude to the gate 47 to switch the SCR 38 to its conductive condition. When the SCR 38 becomes conductive, it closes the enerizing circuit of the electromagnet 23 to the battery 22 and said electromagnet, which is connected to the anode of the SCR 38, is energized via the switches 20 and 32. The electromagnet 23, when energized, moves the arm 24 in clockwise direction about its pivot 26, so that the second lamella 8 is released from the detent 11 and is moved by its spring 10 into the light path 2 and thereby terminates the exposure of the film 1. The arm 24, when it is moved in clockwise direction about its pivot 26, opens the switch 20 and closes the switch 41 via its extending portion 46 and the switch arm 45. The charging capacitor 37 is then discharged via the switches 41 and 42. The first and second lamellas 3 and 8 are then returned to their initial positions, as shown in FIG. 1, by any suitable device such as, for example, by a coupling which couples them to the film advancing sprocket wheels or the like of the camera (not shown).

When it is desired to utilize the dual circuit of FIG. 2 as a light intensity indicator to warn of insufficient intensity of light to permit the taking of a short exposure picture, the push button switch 27 is manually depressed and operates to close the switch 28, to open the switches 30 and 42 and to move each of the switches 29, 31 and 32 from its position shown in FIG. 2 to its opposite position. When the switches 29, 31 and 32 are moved to their opposite positions, they connect the variable resistor 34 and the photoresistor 33 in series across the battery 22 via the switch 28, which is then closed. When the switch 29 is moved to its opposite position, it connects the gate 47 of the SCR 38 to a common point in the connection between the photoresistor 33 and the variable resistor 34. When the switch 28 is moved to its opposite position, in which it is closed, it connects the lamp 40 and the SCR 38 in series across the battery 22. When the switch 30 is moved to its opposite position, in which it is open, it opens the charging circuit of the charging capacitor 37. When the switch 42 is moved to its opposite position, in which it is open, it opens the short-circuit of the charging capacitor 37.

When the push button switch 27 is manually depressed, a current is supplied to the gate or control electrode 47 of the SCR 38 via the variable resistor 34, the photoresistor 33, and the switches 29, 31, 32 and 28 from the battery 22. The magnitude of the current supplied to the gate 47 of the SCR 38 depends upon the adjustment of the variable resistor 34 and upon the intensity of light impinging upon the photoresistor 33 from the object to be photographed. The magnitude of the current supplied to the gate 47 of the SCR 38 may be greater or less than that required to switch said SCR to its conductive condition.

The electrical resistance of the photoresistor 33 varies with the intensity of light impinging upon it from the object to be photographed. The circuit may be so connected that upon the intensity of the light impinging upon the photoresistor 33 being insufficient for taking a clear short-exposure picture, the warning lamp 40 may be deenergized. The circuit may also be connected so that under the same circumstances, the warning lamp 40 may be energized. In the embodiment of FIG. 2, the photoresistor 33 has an electrical resistance in adequate light which is less than that required to produce a current of sufficient magnitude to switch the gate 47 of the SCR 38 to its conductive condition. Thus, when the light is of adequate intensity for clear short-exposure photograph, the current supplied to the gate 47 of the SCR 38 is of insufficient magnitude to switch said SCR to its conductive condition, so that said SCR remains in its non-conductive condition and the lamp 40 remains deenergized. When the light intensity drops to a level which is inadequate for a clear short-exposure photograph, the electrical resistance of the photoresistor 33 increases and the current supplied to the gate 47 of the SCR 38 is of sufficient magnitude to switch said SCR to its conductive condition, so that said SCR is switched to its conductive condition and the lamp 40 is energized. The energization of the lamp 40 warns the photographer that the light intensity is inadequate.

When the push button switch 27 is released, it is returned to its initial position, as shown in FIG. 2, by any suitable means such as, for example, a spring (not shown), and the switches 28, 29, 30, 31, 32 and 42 are returned to their initial positions, as shown in FIGS. 1 and 2. The SCR 38 replaces at least a pair of transistors so that its utilization considerably simplifies the circuit.

While the invention has been described by means of a specific example and in a specific embodiment, I do not wish to be limited thereto, for modifications will occur to those skilled in the art without departing from the spirit and scope of the invention.

What I claim is:

1. An arrangement in a photographic camera for indicating the prevailing light intensity comprising, in combination, a source of DC voltage; photosensitive means exposed to said light intensity and having an electrical characteristic varying with the intensity of light impinging upon said photosensitive means; resistor means in series with said photosensitive means, the series combination of said photosensitive means and said resistor means being connectable across said source of DC voltage; switching means with control input means connected to the junction of said photosensitive means and said resistor means, said switching means transmitting an electrical signal depending upon the electrical state of said control input means; capacitor means connected to said photoresistor means and charged by current flowing through said photoresistor means; means for connecting said capacitor means to said control input means of said switching means; electromagnetic means connected to said switching means and actuated by said switching means depending upon the electrical state of said control input means; and shutter means operated by said electromagnetic means, whereby said shutter means is operated as a function of the charge of said capacitor means determined by the intensity of light impinging upon said photoresistor means.

2. The arrangement in a photographic camera for indicating the prevailing light intensity as defined in claim 1 wherein said photosensitive means comprises photo resistor means with electrical resistance varying as a function of the intensity of light impinging upon said photo resistor means.

3. The arrangement in a photographic camera for indicating the prevailing light intensity as defined in claim 1 including test switching means connected to said indicating means for connecting said source of DC voltage to said indicating means as desired for testing the sufficiency of the prevailing light intensity for taking an exposure with said photographic camera.

4. The arrangement in a photographic camera for indicating the prevailing light intensity as defined in claim 1 wherein said resistor means comprises a variable resistor.

5. The arrangement in a photographic camera for indicating the prevailing light intensity as defined in claim 1 including diode means connected in parallel with said electromagnetic means for protecting said switching means against overload through deenergization of said electromagnetic means.

6. An arrangement in a photographic camera for indicating the prevailing light intensity comprising, in combination, a source of DC voltage; photosensitive means exposed to said light intensity and having an electrical characteristic varying with the intensity of light impinging upon said photosensitive means; resistor means in series with said photosensitive means, the series combination of said photosensitive means and said resistor means being connectable across said source of DC voltage; switching means with control input means connected to the junction of said photosensitive means and said resistor means, said switching means transmitting an electrical signal depending upon the electrical state of said control input means; and indicating means connected to said switching means for indicating the state of said control input means and thereby the state of said junction, whereby said indicating means provides an indication of the prevailing light intensity, said switching means comprises a semiconductor controlled switch.

7. An arrangement in a photographic camera for indicating the prevailing light intensity comprising, in combination, a source of DC voltage; photosensitive means exposed to said light intensity and having an electrical characteristic varying with the intensity of light impinging upon said photosensitive means; resistor means in series with said photosensitive means, the series combination of said photosensitive means and said resistor means being connectable across said source of DC voltage; switching means with control input means connected to the junction of said photosensitive means and said resistor means, said switching means transmitting an electrical signal depending upon the electrical state of said control input means; and indicating means connected to said switching means for indicating the state of said control input means and thereby the state of said junction, whereby said indicating means provides an indication of the prevailing light intensity, said switching means comprises a semiconductor controlled rectifier.

8. An arrangement in a photographic camera for indicating the prevailing light intensity comprising, in combination, a source of DC voltage; photosensitive means exposed to said light intensity and having an electrical characteristic varying with the intensity of light impinging upon said photosensitive means; resistor means in series with said photosensitive means, the series combination of said photosensitive means and said resistor means being connectable across said source of DC voltage; switching means with control input means connected to the junction of said photosensitive means and said resistor means, said switching means transmitting an electrical signal depending upon the electrical state of said control input means; and indicating means connected to said switching means for indicating the state of said control input means and thereby the state of said junction, whereby said indicating means provides an indication of the prevailing light intensity, said switching means comprises a silicon controlled rectifier.

9. An arrangement in a photographic camera for indicating the prevailing light intensity comprising, in combination, a source of DC voltage; photosensitive means exposed to said light intensity and having an electrical characteristic vary with the intensity of light impinging upon said photosensitive means; resistor means in series with said photosensitive means, the series combination of said photosensitive means and said resistor means being connectable across said source of DC voltage; switching means with control input means connected to the junction of said photosensitive means and said resistor means, said switching means transmitting an electrical signal depending upon the electrical state of said control input means, said resistor means comprising a variable resistor; and auxiliary switching means for connecting said photosensitive means and said variable resistor in series combination, said series combination being connected across said source of DC voltage, said auxiliary switching means also connecting said junction of said photosensitive means and said variable resistor to said control input means of said switching means.

10. An arrangement in a photographic camera for indicating the prevailing light intensity comprising, in combination, a source of DC voltage; photosensitive means exposed to said light intensity and having an electrical characteristic varying with the intensity of light impinging upon said photosensitive means; resistor means in series with said photosensitive means, the series combination of said photosensitive means and said resistor means being connectable across said source of DC voltage; switching means with control input means connected to the junction of said photosensitive means and said resistor means, said switching means transmitting an electrical signal depending upon the electrical state of said control input means; capacitor means connected to said photosensitive means and charged by current flowing through said photosensitive means; means for connecting said capacitor means to said control input means of said switching means for controlling said switching means as a function of the charge upon said capacitor means; and auxiliary switching means for connecting said capacitor means in series with said photosensitive means, the combination of said series circuit of said capacitor means and said photosensitive means being connected by said auxiliary switching means across said source of DC voltage.

11. An arrangement in a photographic camera for indicating sufficiency of the prevailing light intensity comprising, in combination, a source of DC voltage with polarity terminals; photosensitive means exposed to said light intensity and having an electrical characteristic varying with the intensity of light impinging upon said photosensitive means; test switching means for connecting when actuated said photosensitive means from one polarity terminal of said source of DC voltage to the other opposite polarity terminal; resistor means connected by said test switching means when actuated in series with said photosensitive means, the series combination of said photosensitive means and said resistor means being connectable across said source of DC voltage; controlled switching means with control input means connected to the junction of said photosensitive means and said resistor means, said controlled switching means transmitting an electrical signal depending upon the electrical state of said control input means; and indicating means connected to said control switching means through said test switching means when actuated for indicating the state of said control input means and thereby the state of said junction, whereby said indicating means provides an indication of the sufficiency of the prevailing light intensity prior to taking an exposure with said photographic camera.

12. The arrangement in a photographic camera for indicating the prevailing light intensity as defined in claim 11 wherein said photosensitive means comprises photo resistor means with electrical resistance varying as a function of the intensity of light impinging upon said photo resistor means.

13. The arrangement in a photographic camera for indicating the prevailing light intensity as defined in claim 11 including test switching means connected to said indicating means for connecting said source of DC voltage to said indicating means as desired for testing the sufficiency of the prevailing light intensity for taking an exposure with said photographic camera.

14. The arrangement in a photographic camera for indicating the prevailing light intensity as defined in claim 11 wherein said resistor means comprises a variable resistor.

References Cited
UNITED STATES PATENTS

| | | | |
|---|---|---|---|
| 3,397,629 | 8/1968 | Mori et al. | |
| 3,056,332 | 10/1962 | Beregowitz | 95—10 |
| 3,106,141 | 10/1963 | Estes | 95—10 |
| 3,124,048 | 3/1964 | Greger et al. | 95—10 |
| 3,205,804 | 9/1965 | Topaz | 95—10 |
| 3,224,350 | 12/1965 | Stimson | 95—10 |
| 3,230,847 | 1/1966 | Gregory et al. | 95—10 |
| 3,232,191 | 2/1966 | Sherwood | 95—10 |
| 3,310,679 | 3/1967 | Babish | 95—10 |
| 3,344,704 | 10/1967 | Simpson et al. | 88—24 |
| 3,349,678 | 10/1967 | Suzuki et al. | 95—10 |
| 3,425,328 | 2/1969 | Ichijo et al. | |

FOREIGN PATENTS

| | | |
|---|---|---|
| 383,763 | 1/1965 | Switzerland. |

NORTON ANSHER, Primary Examiner

J. F. PETERS, Jr., Assistant Examiner

U.S. Cl. X.R.

250—206; 356—227